No. 694,685. Patented Mar. 4, 1902.
P. T. SIEVERT.
MANUFACTURE OF HOLLOW GLASS ARTICLES.
(Application filed June 8, 1901.)
(No Model.)
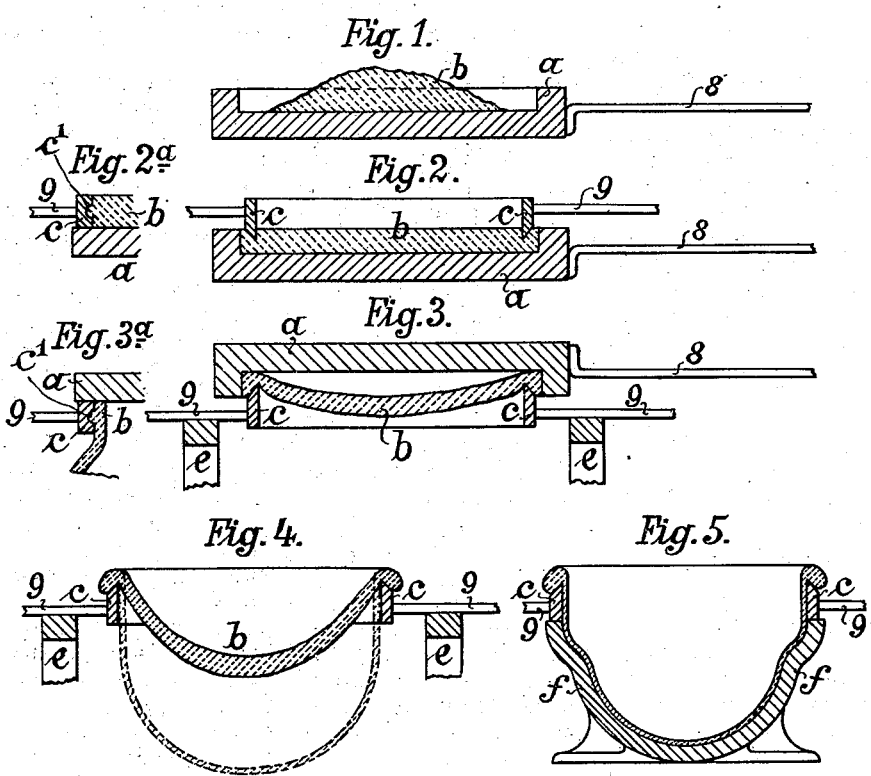

UNITED STATES PATENT OFFICE.

PAUL THEODOR SIEVERT, OF DRESDEN, GERMANY.

MANUFACTURE OF HOLLOW GLASS ARTICLES.

SPECIFICATION forming part of Letters Patent No. 694,685, dated March 4, 1902.

Application filed June 8, 1901. Serial No. 63,713. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in the Manufacture of Hollow Glass Articles, of which the following is a specification.

In practice the production of hollow glass articles according to the present invention begins with the spreading of a layer of molten glass upon any suitable support, which support is preferably reversible. Upon this layer of glass, while still remaining in a softened or plastic condition by the retention of a portion of the heat of fusion, a shaping frame, ring, or rim is laid and pressed. The support, with the glass layer and the shaping-ring, is then turned over, and the glass layer is freed from the support and left suspended by its edges from the ring or frame. The glass layer, which now sinks and sags inside the frame by reason of its viscous glowing state, forms itself into a hollow article which assumes of its own accord the basin-shaped form, which is determined by the shape of the frame as regards its open end and as regards the thickness of wall and depth by the sagging of the glass, in combination with the shape of the frame. In this manner hollow glass articles of certain form may be produced complete without a mold and without the application of pressure, (whether produced by blowing or otherwise.) Molds, however, may be employed in the production of these articles, into which molds the glass bag hanging from the frame is allowed to sag and settle itself against the walls thereof and by contact with the said walls receive a definite form without the assistance of internal pressure.

It is to be remarked that previously-manufactured sheets of glass have been already converted into hollow bodies or articles by the following method, viz: Cold sheets of glass having been inserted in horizontal frames and fixed therein are placed in a heating-oven, with the result that the sheets become plastic and sag freely, or into molds arranged below the said frames. This process, however, has this serious disadvantage, in view of the process forming the object of the present invention, in that there is a second heating of the glass sheets, and the frame, ring, or rim being repeatedly exposed to heat will soon become destroyed and unfit for use.

In the accompanying drawings, Figures 1, 2, 2$^a$, 3, 3$^a$, 4, 5 represent in vertical section apparatus by the use of which my improved process has been practically performed.

Fig. 1 represents the plate or support $a$, hereinbefore mentioned, having poured out upon it a sufficient quantity of molten glass $b$ to form the hollow article desired. Fig. 2 shows said plate with the glass $b$ spread out upon it into a uniform flat layer and with the frame, rim, or ring $c$ before mentioned placed upon said layer and having its edges pressed thereinto. The plate $a$ is represented as provided with a handle 8 and the frame, rim, or ring $c$ as provided with handles 9 9.

Fig. 3 shows the plate $a$ and frame, ring, or rim $c$ inverted together and supported by the handles 9 9, resting upon stationary supports $e$ $e$, and shows the glass layer $b$ as beginning to sag or sink within the frame for the formation of the desired hollow article.

Fig. 4 represents the frame, rim, or ring $c$ remaining on the supports $e$ $e$ without the plate $a$, the latter having been removed. The glass $b$, retained in a plastic state by the remaining heat of fusion and hanging within $c$, from the edges thereof, gradually assumes by its weight a deeper and deeper bowl-like form until by cooling it has ceased to be plastic. The form which it may finally receive is indicated in dotted outline.

Fig. 5 illustrates the carrying out of the process by the employment of a mold $f$, open at the top. This mold has its interior cavity of a form the counterpart of that desired for the exterior of the hollow article to be produced. The frame, rim, or ring $c$, with the glass dependent from and within its edges, being placed upon the edges of the said mold and thereon supported the plastic glass sags or sinks by its own weight within the mold until by coming to rest against the interior thereof it receives the desired shape.

Figs. 2$^a$ and 3$^a$ illustrate a modification of the frame $c$, which is made with an internal groove $c'$ running all around it for the purpose of holding the edges of the spread layer $b$ of glass. For the use of this holding-frame $c$ the plate $a$ is made without the surrounding upwardly-projecting rim shown upon it in Figs. 1, 2, and 3, and in such use the said frame is placed upon the plate $a$ before the pouring of the molten glass upon the latter, and then the molten glass is poured within the said frame.

What I claim as my invention is—

1. The process herein described for the production of hollow glass articles from liquid glass, consisting in spreading out the liquid glass in a sheet-like flat layer, holding the so-spread layer on outlines corresponding with the surrounding outlines of the hollow article to be produced while those parts of said layer included within said outlines are unsupported from beneath, and allowing the so-included parts, while remaining plastic by the retention of a portion of the heat of fusion, to shape themselves by their own weight, substantially as herein described.

2. The process herein described for the molding of hollow glass articles of a desired shape consisting in spreading out liquid glass in a sheet-like layer and holding the so-spread layer on outlines corresponding with the surrounding outlines of the hollow article to be molded while those parts of said layer included within said outlines, while remaining plastic by the retention of a portion of the heat of fusion, mold themselves into the desired shape by their own weight, substantially as herein described.

In testimony that I claim the foregoing as my invention I have signed my name, in presence of two witnesses, this 25th day of May, 1901.

PAUL THEODOR SIEVERT.

Witnesses:
HERNANDO DE SOTO,
PAUL ARRAS.